United States Patent [19]

Sakauchi

[11] Patent Number: 5,239,537
[45] Date of Patent: Aug. 24, 1993

[54] PACKET-SWITCHED NETWORK HAVING ALTERNATE VIRTUAL PATHS

[75] Inventor: Hideki Sakauchi, Tokyo, Japan

[73] Assignee: NEC Corporation, Tokyo, Japan

[21] Appl. No.: 776,431

[22] Filed: Oct. 17, 1991

[30] Foreign Application Priority Data

Oct. 17, 1990 [JP] Japan .................................. 2-278251

[51] Int. Cl.⁵ .............................................. H04J 3/14
[52] U.S. Cl. ........................................ 370/16; 370/13;
340/827; 371/7; 371/8.2; 379/221
[58] Field of Search ................ 370/13, 16; 371/7, 8.2;
340/827; 379/221, 273

[56] References Cited

U.S. PATENT DOCUMENTS

| | | | |
|---|---|---|---|
| 4,884,263 | 11/1989 | Suzuki | 370/16 |
| 4,905,233 | 2/1990 | Cain et al. | 370/17 X |
| 4,993,014 | 2/1991 | Gordon | 370/16 |
| 5,016,243 | 5/1991 | Fite, Jr. | 370/16 |

OTHER PUBLICATIONS

Standards Project: Broadband Aspects of ISDN T1S1.1/88-427 Oct. 10, 1988, pp. 128-137.

*Primary Examiner*—Douglas W. Olms
*Assistant Examiner*—Russell W. Blum
*Attorney, Agent, or Firm*—Foley & Lardner

[57] ABSTRACT

In a broadband ISDN system where each switching node is connected to each adjacent node by a transmission line having communication links and a service link, the switching node comprises a self-routing network for routing a cell from an input to an output of the network according to a virtual path identifier it contains. Static connections are established between communication links and the routing network by a digital cross-connect system. A virtual path memory stores data indicating link-to-link connections associated with normal virtual paths and link-to-link connections associated with alternate virtual paths. A fault detector is coupled to the communication links to detect a link failure. If a link failure occurs, a fault message is transmitted to adjacent switching nodes through service links, and data corresponding to the faulty link is retrieved from the memory in response to a fault message that is received from the fault detector or from an adjacent node. The cross-connect system is controlled in accordance with the retrieved data so that the route of the cells is switched from a normal virtual path to an alternate virtual path.

2 Claims, 3 Drawing Sheets

FIG. 3

| NODE ID | NORMAL OR LINK FAILURE | CONNECTIONS TO BE ESTABLISHED OR CLEARED | |
|---|---|---|---|
| 1 | NORMAL | CPE 21 | L1 – V1 |
| | LINK FAILURE (L1∪L4∪L7) | CPE 21 | L2 – V11 |
| | NORMAL | CPE 22 | L2 – V2 |
| | LINK FAILURE (L2∪L6∪L9) | CPE 22 | L1 – V12 |
| | LINK FAILURE (L3) | L1 – V15 | L2 – V15 |
| 2 | NORMAL | L1 – V1 | L4 – V1 |
| | LINK FAILURE (L1∪L4∪L7) | CLEAR L1-V1 | CLEAR L4-V1 |
| | LINK FAILURE (L2∪L6∪L9) | L1 – V12 | L2 – V12 |
| | NORMAL | CPE 23 | L3 – V5 |
| | LINK FAILURE (L3) | CPE 23 | L1 – V15 |
| | NORMAL | CPE 24 | L5 – V4 |
| | LINK FAILURE (L5) | CPE 24 | L4 – V14 |
| 3 | NORMAL | L2 – V2 | L6 – V2 |
| | LINK FAILURE (L2∪L6∪L9) | CLEAR L2-V2 | CLEAR L6-V2 |
| | LINK FAILURE (L1∪L4∪L7) | L2 – V11 | L6 – V11 |
| | NORMAL | CPE 25 | L3 – V5 |
| | LINK FAILURE (L3) | CPE 25 | L2 – V15 |
| 4 | NORMAL | L4 – V1 | L7 – V1 |
| | LINK FAILURE (L1∪L4∪L7) | CLEAR L4-V1 | CLEAR L7-V1 |
| | LINK FAILURE (L2∪L6∪L9) | L4 – V12 | L7 – V12 |
| | LINK FAILURE (L5) | L4 – V14 | L8 – V14 |
| | NORMAL | CPE 26 | L8 – V3 |
| | LINK FAILURE (L8) | CPE 26 | L7 – V13 |
| 5 | NORMAL | L6 – V2 | L9 – V2 |
| | LINK FAILURE (L2∪L6∪L9) | CLEAR L6-V2 | CLEAR L9-V2 |
| | LINK FAILURE (L1∪L4∪L7) | L6 – V11 | L9 – V11 |
| | NORMAL | CPE 27 | L5 – V4 |
| | LINK FAILURE (L5) | CPE 27 | L8 – V14 |
| | NORMAL | CPE 28 | L8 – V3 |
| | LINK FAILURE (L8) | CPE 28 | L9 – V13 |
| 6 | NORMAL | CPE 29 | L7 – V1 |
| | LINK FAILURE (L1∪L4∪L7) | CPE 29 | L9 – V11 |
| | NORMAL | CPE 30 | L9 – V2 |
| | LINK FAILURE (L2∪L6∪L9) | CPE 30 | L7 – V12 |
| | LINK FAILURE (L8) | L7 – V13 | L9 – V13 |

PACKET-SWITCHED NETWORK HAVING ALTERNATE VIRTUAL PATHS

BACKGROUND OF THE INVENTION

The present invention relates generally to switched communications systems, and more specifically to an ATM (asynchronous transfer mode) switching system for ISDN (integrated services digital network) systems.

It is known that circuit-switched networks are provided with spare links or channels which are physically preassigned as alternate routes to all operating links or channels. In the event of a failure, connections are switched from a normal link or channel to the preassigned alternate route. With packet-switching networks such as broadband ISDN systems, on the other hand, packets of fixed length, or 'ATM cells' are transported on a 'virtual' path that is established by successive switching nodes in response to a virtual path identifier (VPI) contained in the cells. Since the overall transmission capacity of a virtual path is determined by the transmission capacities of its constituent links, virtual paths must be treated as indivisible units for determining an alternate route. Therefore, the alternate routing technique of the circuit-switched network cannot apply to the packet-switched network.

SUMMARY OF THE INVENTION

It is therefore an object of the present invention to provide a packet-switched network capable of automatically establishing an alternate virtual path in the event of a link failure.

According to the present invention, there is provided a broadband ISDN (integrated services digital network) system comprising a plurality of switching nodes interconnected by transmission lines having communication links and service links. Each of the switching nodes comprises an ATM (asynchronous transfer mode) self-routing network for routing cells from the inputs and outputs of the network transmission links according to a virtual path identifier contained in the cells. Static connections are established between the communication links and the self-routing network by a cross-connect system. A virtual path memory is provided for storing data indicating link-to-link connections associated with normal virtual paths and data indicating link-to-link connections associated with alternate virtual paths. A fault detector is coupled to the communication links to detect a failure in the communication links and notify this fact to a fault message transceiver through which fault message are informed to adjacent switching nodes through service links. Data stored in the virtual path memory is retrieved in response to a fault message that is received from the fault detector or from an adjacent node via the fault message transceiver. The cross-connect system is controlled in accordance with the retrieved data so that the route of the cells is switched from a normal virtual path to an alternate virtual path.

BRIEF DESCRIPTION OF THE DRAWINGS

The present invention will be described in further detail with reference to the accompanying drawings, in which:

FIG. 3 is a tabulation of connection data stored in the virtual path memory of each switching node.

DETAILED DESCRIPTION

Figure 1:
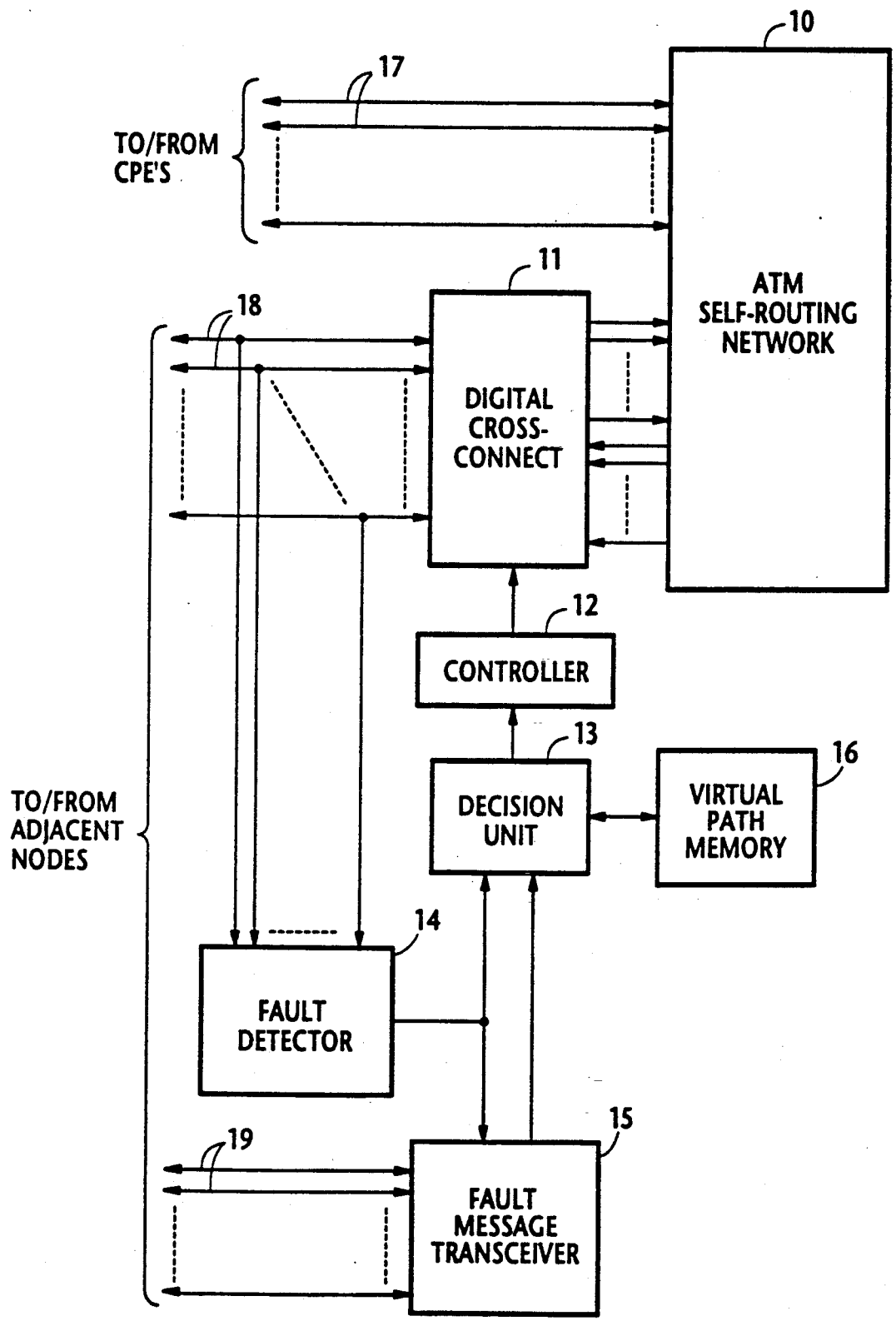
FIG. 1 is a block diagram of an ATM switching node according to the present invention.

Referring to FIG. 1, there is shown one of ATM (asynchronous transfer mode) switching nodes of a broadband ISDN communications system. The switching node comprises an ATM self-routing network 10 having line terminals where subscriber lines 17 to and from customer premises equipment (CPE's) are terminated. Self-routing network 10 has trunk terminals to which transmission links 18 to and from adjacent switching nodes are terminated via a digital cross-connect system 11. Signals from CPE's or adjacent nodes are sent in the form of packets of a predetermined bit length, or 'ATM cells' each with a header containing a virtual path identifier. In a manner as described in a paper submitted to the T1S1.1 Technical Subcommittee Working Group Members, titled 'Transport example for connectionless data service in a B-ISDN network', self-routing network 10 checks the header of each cell against routing data contained in a map and updates the header with a virtual path identifier. By examining the virtual path identifier of each cell, self-routing network 10 provides routing of the cell to one of its outgoing terminals.

A fault detector 14 is connected to transmission links 18 to constantly monitor their operating performance and informs a decision unit 13 of the occurrence of a link fault, if there is one. The faulty condition of a link is communicated by way of a fault message transceiver 15 to adjacent nodes by way of service lines 19. A fault message may be transmitted from a remote switching node, and relayed by an adjacent switching node to the fault message transceiver 15. On receiving it, the transceiver 15 informs decision unit 13 of this fact.

A virtual path memory 16 is associated with the decision unit 13. As will be described, virtual path memory 16 stores data indicating connections to be established or cleared depending on the identifiers of the faulty link detected by the fault detector 14. Decision circuit 13 reads appropriate data from the memory 16 into a controller 12 in response to the identifier of the faulty link. Controller 12 applies a switching signal to digital cross-connect system 11 to clear the faulty connection and establish a new connection between appropriate transmission links 18 via self-routing network 10.

Figure 2:
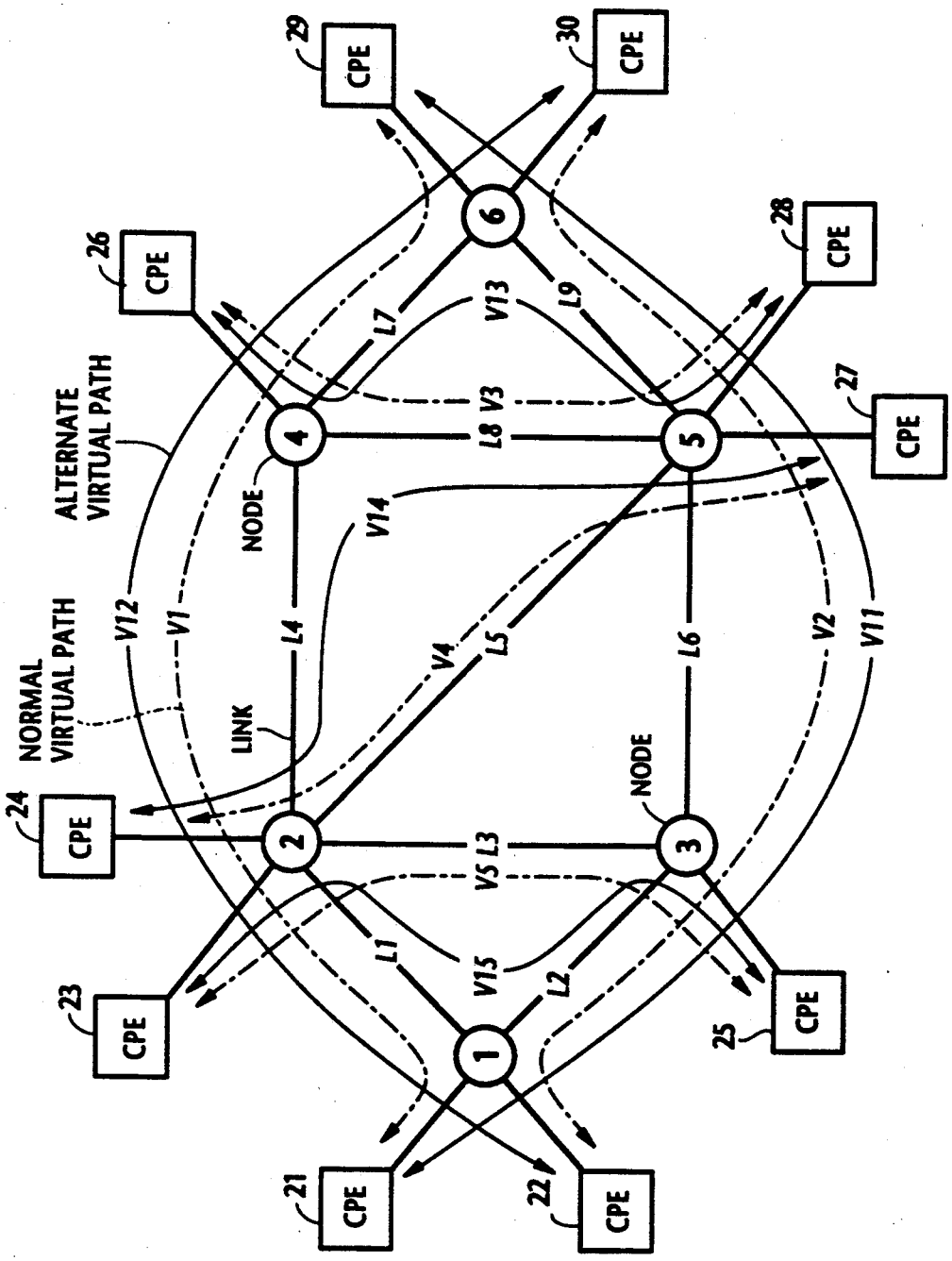
FIG. 2 is a view illustrating the routing of normal and alternate virtual paths in a typical example of a broadband ISDN system.

As shown in FIG. 2, a typical example of the B-ISDN communications system comprises switching nodes 1 through 6 serving customer premises equipments 21 through 30 and the switching nodes 1-6 are shown interconnected by links L1-L9. Assume that the system is normal and all links are operating properly, that virtual paths V1 through V5 are established as indicated by chain-dot lines. For example, virtual path V1 is assumed to be set up between CPE 21 and CPE 29 by way of switching nodes 1, 2, 4 and 6 involving links L1, L4 and L7, and virtual path V2 is set up between CPE 22 and CPE 30 by way of switching nodes 1, 3, 5 and 6 involving links L2, L6 and L9.

To establish virtual path V1 between CPE's 21 and 29, the virtual path memory 16 of switching node 1 stores data identifying a connection between CPE 21 and link L1, as shown in FIG. 3, and the memory 16 of node 2 stores data identifying a connection between links L1 and L4. Likewise, the memory 16 of node 4 stores data identifying a connection between links L4 and L7, and the memory 16 of node 6 stores data identifying a connection between CPE 29 and link L7.

In like manner virtual path V2 is established between CPE's 22 and 30 by storing data into the node-1 virtual path memory 16 identifying a connection between CPE 22 and links L2, storing data into the node-3 memory 16 identifying a connection between links L2 and L6, storing data into the node-5 memory 16 identifying a connection between links L6 and L9, and storing data into the node-6 memory 16 identifying a connection between CPE 30 and link L9. Virtual path V3 is established between CPE's 26 and 28 by storing data into the node-4 memory 16 that indicates a connection between CPE 26 and link L8 and data into the node-5 memory 16 that indicates a connection between link L8 and CPE 28, and virtual path V4 is established between CPE's 24 and 27 by storing data into the node-2 memory 16 that indicates a connection between CPE 24 and link L5 and data into the node-5 memory 16 that indicates a connection between link L5 and CPE 28. Likewise, for establishing virtual path V5 between CPE's 23 and 25, switching nodes 2 and 3 store data identifying a connection between CPE 23 and link L3 and a connection between CPE 25 and link L3, respectively.

The virtual path memory 16 of each switching node further stores alternate virtual path data that specifies connections which are to be established when a link failure occurs in any part of the system.

Specifically, the node-1 memory 16 stores data indicating a connection between CPE 21 and link L2 to establish part of a virtual path V11 in a memory location corresponding to a faulty condition that occurs on any of links L1, L4 and L7 comprising the virtual path V1. Further stored in that memory is data indicating a connection between CPE 22 and link L1 to establish part of a virtual path V12 in a memory location corresponding to a failure on any of links L2, L6 and L9 comprising the virtual path V2. It additionally specifies a connection between links L1 and L2 in a memory location corresponding to a failure on link L3 to establish part of a virtual path V15.

The node-2 memory 16 stores a disconnect command for clearing the connection between links L1 and L4 comprising part of virtual path V1 in a memory location corresponding to the failure of virtual path V1, and data indicating a connection between links L1 and L2 to establish part of virtual path V12 in a memory location corresponding to the failure of virtual path V2. It additionally specifies a connection between CPE 23 and link L1 in response to the failure of link L3 to establish part of virtual path V15 and a connection between CPE 24 and link L4 in response to a failure on link L5 to establish part of a virtual path 14.

The node-3 memory 16 stores a disconnect command for clearing the connection between links L2 and L6 comprising part of virtual path V2 in response to the failure of virtual path V2, and data indicating a connection between links L2 and L6 to establish part of virtual path V11 in a memory location corresponding to the failure of virtual path V2. It additionally specifies a connection between CPE 2S and link L2 in response to the failure of link L3 to establish part of virtual path V15.

The node-4 memory 16 stores a disconnect command for clearing the connection between links L4 and L7 comprising part of virtual path V1 in a memory location corresponding to the failure of virtual path V1, and data indicating a connection between links L4 and L7 to establish part of virtual path V12 in a memory location corresponding to the failure of virtual path V2. It additionally specifies a connection between links L4 and L8 in response to the failure of link L5 to establish part of virtual path V14 and a connection between CPE 26 and link L7 in response to a failure on link L8 to establish part of a virtual path 13.

The node-5 memory 16 stores a disconnect command for clearing the connection between links L6 and L9 comprising part of virtual path V2 in response to the failure of virtual path V2, and data indicating a connection between links L6 and L9 to establish part of virtual path V11 in a memory location corresponding to the failure of virtual path V1. It additionally specifies a connection between CPE 27 and link L8 in response to the failure of link L5 to establish part of virtual path V14 and a connection between CPE 28 and link L9 in response to the failure of link L8 to establish part of virtual path V13.

The node-6 memory 16 stores data indicating a connection between CPE 29 and link L9 to establish part of a virtual path V11 in a memory location corresponding to the failure of virtual path V1 and a connection between CPE 30 and link L9 to establish part of virtual path V12 in response to the failure of virtual path V2. It additionally specifies a connection between links L7 and L9 in a location corresponding to the failure of link L8 to establish part of virtual path V13. Note that all connection data in virtual path memories 16 include a command for clearing a link connection associated with the failed virtual path.

If a link failure has occurred on link L1 during a session between CPE 21 and CPE 29, the fault detector 14 of switching node 1 notifies decision circuit 13 and fault message transceiver 15 of this faulty condition. The latter communicates this fact to the fault message transceiver 15 of switching node 3 and is successively relayed to switching nodes 4 and 6. The faulty condition is also detected by the fault detector 14 of switching node 2 which informs its decision circuit 13 as well as to its fault message transceiver 15. The latter communicates this fact to switching node 4 and is relayed to switching node 6.

In switching node 1, decision circuit 13 makes a search through virtual path memory 16 and detects a match between the identifier of the faulty link and a link identifier stored in a memory location. If a match occurs, it reads connection data from that memory location. Thus, connection data indicating CPE 21 and link L2 and a command for clearing connection between CPE 21 and link L1 are read out of memory 16 of switching node 1 and supplied to controller 12 to generate a switching signal. In response to the switching control data from controller 12, digital cross-connect system 11 reestablishes a full-duplex connection that couples CPE 21 via self-routing network 10 to link L2, establishing part of virtual path V11, and clears the previous connection between CPE 21 and link L1. In switching node 3, decision circuit 13 reads corresponding connection data from virtual path memory 16 and digital cross-connect system 11 reestablishes a full-duplex connection therein that couples link L2 via self-routing network 10 to link L6, forming part of virtual path V11. Likewise, switching node 5 establishes a connection between links L6 and L9, while switching node 6 clears the connection between CPE 29 and link L7 and reconnects CPE 29 to link 9, completing the virtual path V11. In switching nodes 2 and 4, connection between links L1 and L4 and connection between links L4 and L7 are cleared successively. In this way, virtual path V1 is switched to virtual path V11. If link failure occurs in link L4 or L7, similar events occur in all the switching nodes to establish virtual path V11 instead of V1.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A packet switched communications system comprising a plurality of switching nodes, each switching node being connected by a transmission line to each one of a plurality of adjacent switching nodes, the transmission line including communication links for transporting packets and a service link for transporting a fault message, each of said switching nodes comprising:
   a switching network for routing packets from inputs to outputs of the network according to a virtual path identifier contained in the packets;
   cross-connect means for establishing connections between the communication links and the inputs of said switching network;
   a memory for storing data indicating link-to-link connections associated with normal virtual paths and data indicating link-to-link connections associated with alternate virtual paths;
   fault detector means for detecting a failure in said communication links;
   fault message transceiver means coupled to said fault detector means and to the service links terminated in adjacent switching nodes for transmitting a fault message identifying a faulty communication link to an adjacent switching node, and relaying a like fault message received from an upstream switching node to a downstream switching node; and
   means for retrieving data from said memory corresponding to the faulty communication link identified by the fault message either from said fault detector means or said fault message transceiver means and causing said cross-connect means to reconfigure connections according to the retrieved data so that the route of the packets is switched from a normal virtual path to an alternative virtual path.

2. A broadband ISDN (integrated services digital network) system comprising a plurality of switching nodes, each switching node being connected by a transmission line including communication links for transporting packets and a service link for transporting a fault message, each of said switching nodes comprising:
   an ATM (asynchronous transfer mode) self-routing network for routing cells from inputs to outputs of the network according to a virtual path identifier contained in the cells;
   cross-connect means for establishing connections between the communication links and the inputs of said self-routing network;
   a memory for storing data indicating link-to-link connections associated with normal virtual paths and data indicating link-to-link connections associated with alternate virtual paths;
   fault detector means for detecting a failure in said communication links;
   fault message transceiver means coupled to said fault detector means and to the service links terminated in adjacent switching nodes for transmitting a fault message identifying a faulty communication link to an adjacent switching node, and relaying a like fault message received from an upstream switching node to a downstream switching node; and
   means for retrieving data from said memory corresponding to the faulty communication link identified by the fault message either from said fault detector means or said fault message transceiver means and causing said cross-connect means to reconfigure connections according to the retrieved data so that the route of the cells is switched from a normal virtual path to an alternative virtual path.

* * * * *